United States Patent [19]
Akiyama et al.

[11] 3,985,193
[45] Oct. 12, 1976

[54] VEHICLE SEMI-PASSIVE OCCUPANT RESTRAINING BELT ARRANGEMENT

[75] Inventors: Yoshinori Akiyama; Toshinori Matsumoto; Katsunobu Sobajima, all of Yokohama, Japan

[73] Assignee: Nissan Motor Co., Ltd., Japan

[22] Filed: July 23, 1975

[21] Appl. No.: 598,391

[30] Foreign Application Priority Data
July 26, 1974  Japan.............................. 49-85675

[52] U.S. Cl.............................. 180/82 C; 280/745; 340/52 R
[51] Int. Cl.$^2$......................................... B60R 21/02
[58] Field of Search............. 280/150 SB; 180/82 C, 180/111; 340/52 R, 52 E

[56]  References Cited
UNITED STATES PATENTS

| | | | |
|---|---|---|---|
| 3,764,161 | 10/1973 | Bright............................ | 280/150 SB |
| 3,831,702 | 8/1974 | Kanzko............................ | 180/82 C |
| 3,856,327 | 12/1974 | Otani............................ | 280/150 SB |
| 3,865,397 | 2/1974 | Pilhall............................ | 280/150 SB |

Primary Examiner—Robert R. Song
Attorney, Agent, or Firm—Robert E. Burns; Emmanuel J. Lobato; Bruce L. Adams

[57]  ABSTRACT

A semi-passive occupant restraining belt arrangement comprises a first belt having one end fixed to an inboard lower rear portion of the door and other end received by a first releasable automatic locking inertia retractor mounted adjacent a lower inboard portion of a seat. A second belt is provided having one end secured to an intermediate portion of the first belt and other end received by a second releasable automatic locking inertia retractor mounted adjacent an upper outboard portion of the seat. Release means are provided for releasing the first and second locking inertia retractors. A belt hanger is mounted forward and above the seat and has a hook for receiving the second belt. Motor means moves the hook from an operative position, in which if the second belt is hung on the hook the hook will receive the second belt, to an inoperative position in which the hook will release the second belt. Control means actuates the motor means to move the hook from the operative position to the inoperative position upon closure of the door with the seat occupied. The control means actuates the release means to release the first and second locking retractors during door opening and closing movements.

3 Claims, 3 Drawing Figures

VEHICLE SEMI-PASSIVE OCCUPANT RESTRAINING BELT ARRANGEMENT

BACKGROUND OF THE INVENTION

The present invention relates to a vehicle semi-passive occupant restraining belt arrangement and more particularly to such an arrangement in which a belt hanger is fixedly mounted on the vehicle body within an occupant compartment forward and above the seat and when a vehicle door is opened with a shoulder belt hung on and received by a hook of the belt hanger, the belt arrangement assumes an easy-enter position.

SUMMARY OF THE INVENTION

The present invention provides a vehicle semi-passive occupant restraining belt arrangement in which when a vehicle door is opened with a shoulder belt hung on and received by a hook of a belt hanger fixedly mounted on the vehicle body within an occupant compartment forward and above a seat, the shoulder belt and a lap belt are moved to respective easy-enter positions and the hook of the belt hanger is moved to an inoperative position to release the shoulder belt upon closing of the vehicle body door with the vehicle seat occupied.

Accordingly, an object of the present invention is to provide a vehicle semi-passive occupant restraining belt arrangement in which a shoulder belt and a lap belt are moved to easy-enter positions when a vehicle door is opened with the shoulder belt hung on a hook of a belt hanger and the hook is moved to its inoperative position to release the shoulder belt to permit the shoulder belt and the lap belt to occupant restraining positions upon closing the vehicle body door with the corresponding vehicle seat occupied.

Another object of the present invention is to provide a control system for a hook of a belt hanger of a semi-passive occupant restraining belt arrangement of the above character.

Still another object of the present invention is to provide a control circuit which includes a first means, associated with a vehicle door, indicative of a "door open" and a "door closed" condition; a second means, associated with a vehicle seat, indicative of a "seat occupied" and a "seat unoccupied" condition; and which actuates a motor upon closing of the vehicle door with the seat occupied.

BRIEF DESCRIPTION OF THE DRAWINGS

These and other objects, features and advantages of the present invention will be readily apparent from the following detailed description and accompanying drawings, in which.

DESCRIPTION OF THE PREFERRED EMBODIMENT

Figure 1:
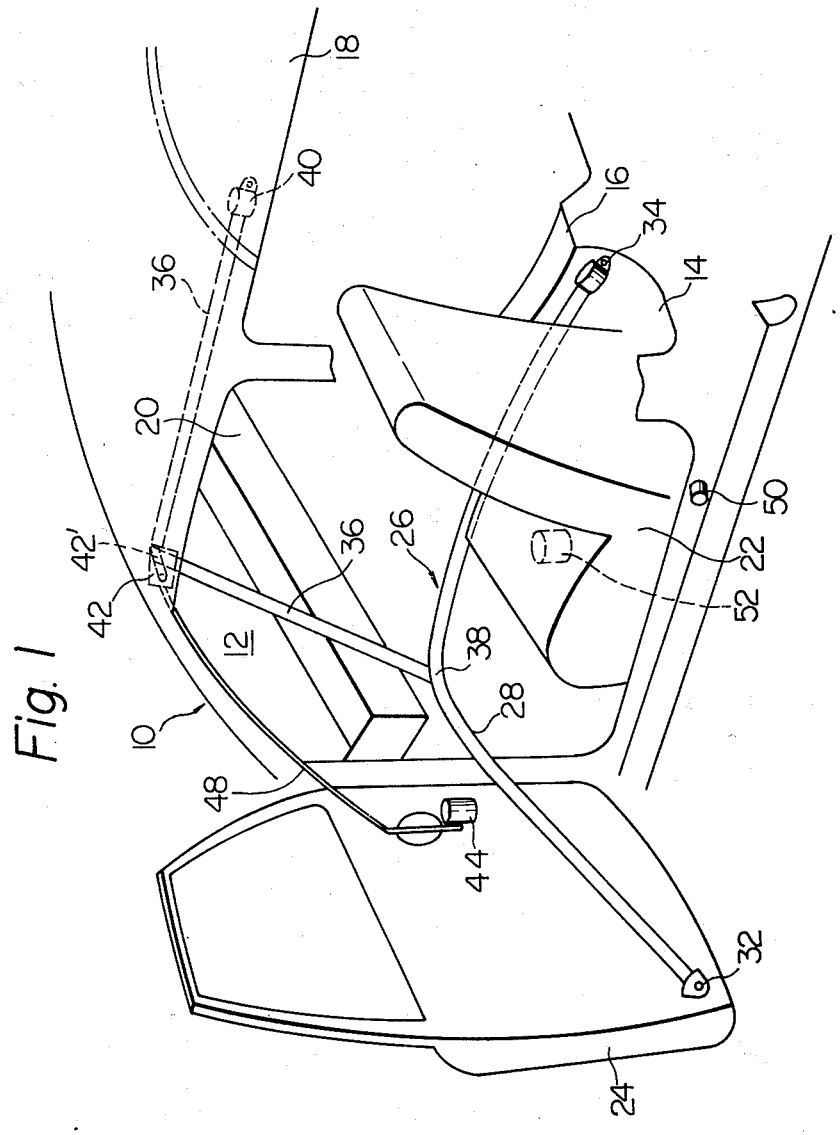
FIG. 1 is a view of a portion of a vehicle body whose door is shown in open position and which includes a semi-passive occupant restraining belt arrangement according to the present invention shown in an easy-enter position.

Referring now to the accompanying drawings and particularly to FIG. 1, a vehicle body generally indicated by 10 includes a windshield 12, a floor 14 with a conventional transmission tunnel 16, and a roof 18 that cooperate to define an occupant compartment 20. A conventional vehicle seat 22 is mounted within the occupant compartment 20 in the usual manner and is accessible through a vehicle body door opening selectively opened and closed by a vehicle body door 24 whose front edge is pivotally mounted to the body 10 in the conventional manner.

A semi-passive occupant restraining belt arrangement is generally indicated by 26 and includes a first belt 28, or a lap belt, having one end fixed to an inboard lower rear portion of the vehicle body door 24 by an attachment 32 and the other and received by a conventional inertia retractor 34 mounted adjacent a lower inboard portion of the seat 22. A second belt 36, or a shoulder belt, has one end secured to an intermediate portion 38 of the first belt 28 and has the other end received by a conventional inertia retractor 40 mounted adjacent an upper outboard portion of the seat 22. A belt hanger 42 is fixedly mounted on the vehicle body 10 within the occupant compartment 20 forward and above the seat 22 and has a hook 42'. The hook 42' has an operative position in which if and when an intermediate portion of the second belt 36 is manually hung on the hook 42', the hook 42' will receive the second belt 36. Thus the first and second belts 28 and 36 will move to the FIG. 1 illustrated easy-enter positions when the door 24 is opened with the second belt 36 received by the hook 42'. The hook 42' is spring biased toward its operative position. A motor unit 44 mounted on an inboard upper forward portion of the door 24 is operatively connected to the hook 42' by means of a wire 48 so that when the motor unit 44 is actuated, the hook 42' is moved to an inoperative position in which if the second belt 36 is manually hung on the hook 42', the hook 42' will not receive the second belt 36. The motor unit 44, although shown only as a box, is constructed of a motor, a drive mechanism to convert a rotational drive of the motor to a linear drive and an auto stop mechanism including a limit switch. Of course, if desired, the motor unit 48 may be constructed of a conventional solenoid actuator (not shown) providing a linear drive. A control system for actuating the motor unit 48 includes a first normally closed switch 50 (a door switch), associated with the vehicle door 24. The first switch 30 is closed when the door 24 is open and is open when the door 24 is closed. A second normally open switch 52 (a seat switch), associated with the vehicle seat 22, is open when the seat 22 is unoccupied and is closed when the seat 22 is occupied. It will be noted that the first switch 50 is indicative of a door open and a door closed condition and the second switch 52 is indicative of a seat occupied and a seat unoccupied condition.

Figure 2:
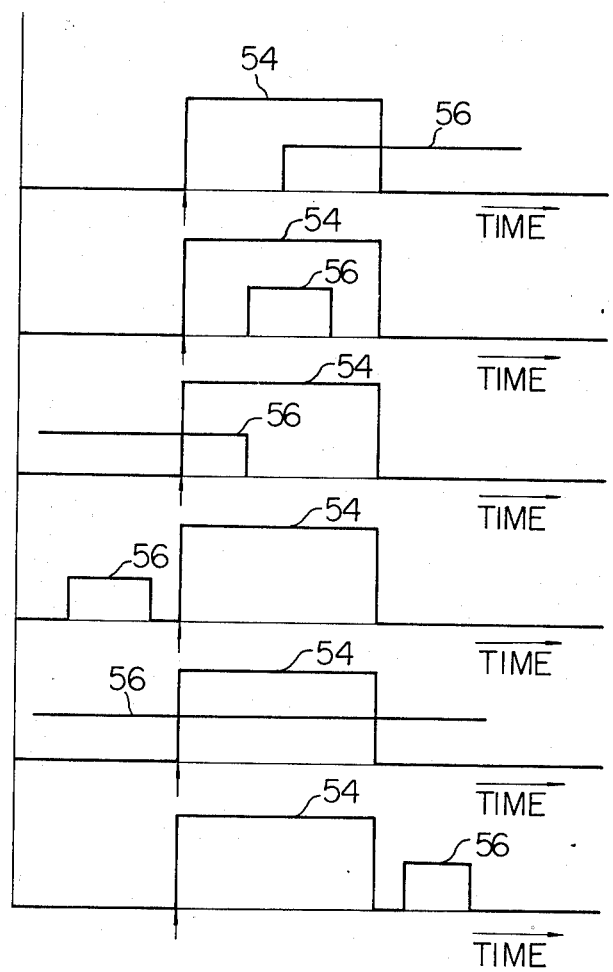
FIG. 2 shows timing diagrams.

Referring to FIG. 2 there are shown timing diagrams of the switches 50 and 52 in various modes. In each of the timing diagrams, a pulse-shaped signal designated by 54 indicates the door open condition of the switch 50 and a signal 56 indicates the seat occupied condition of the switch 52. The timing diagrams are representations of the following conditions, respectively.

Mode 1 . . . The seat 22 is occupied after the door 24 is opened and subsequently the door 24 is closed ("normal getting-in").

Mode 2 . . . The seat 22 is occupied after the door 24 is opened and subsequently the seat 22 is again unoccupied before the door 24 is closed again.

Mode 3 ... The seat 22 having been occupied is unoccupied after the door 24 is opened and subsequently the door 24 is closed ("normal getting-out").

Mode 4 ... The door 24 is opened and subsequently closed with the seat 22 unoccupied.

Mode 5 ... The door 24 is opened and closed with the seat 22 being kept occupied.

Mode 6 ... The door 24 is opened and subsequently closed with the seat 22 unoccupied.

Figure 3:
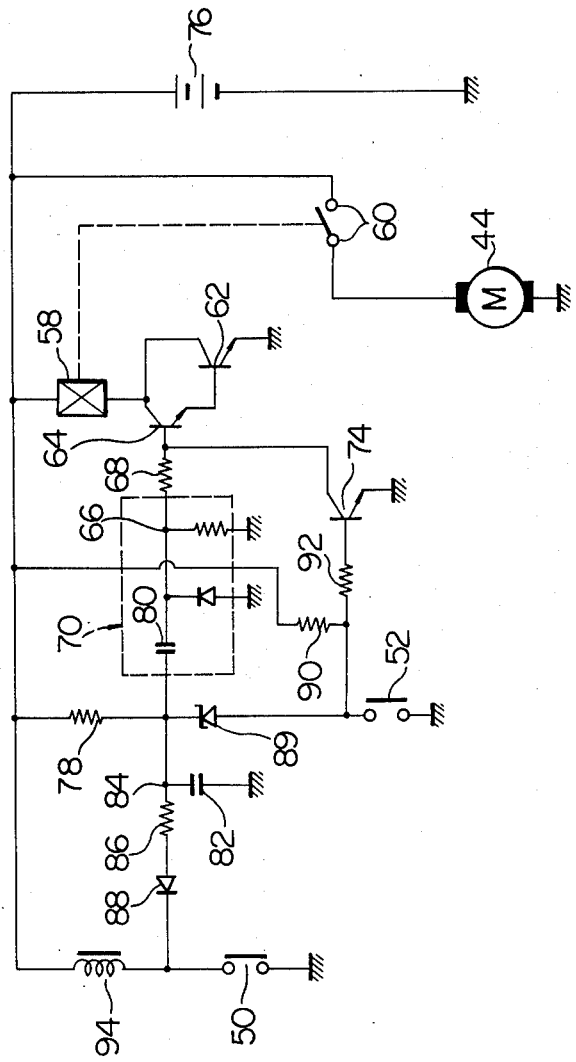
FIG. 3 is a circuit diagram of a control system of the semi-passive occupant restraining belt arrangement.

Referring to FIG. 3 there is shown a circuit diagram of the control system. The control system shown in FIG. 3 is configured and arranged as to actuate the motor unit 44 to move the hook 42' from the operative position to the inoperative position upon closing or closure of the door 24 with the seat 22 occupied (see Modes 1 and 5 of FIG. 2).

In FIG. 3 a relay coil 58 has a pair of relay contacts 60 which are normally open and are connected in series with the motor unit 44. The relay coil 58 is circuited with a power transistor 62 connected with a trigger transistor 64 in such a manner that applying a breakdown voltage to the base terminal of the trigger transistor 64 will result in energization of the relay coil 58. The base terminal of the trigger transistor 64 is connected to a terminal 66 through a resistor 68. The terminal 66 is an output terminal of a timer circuit generally designated by 70. The voltage at the output terminal 66 rises above the breakdown voltage of the trigger transistor 64 upon opening of the first switch 50 as will be understood as the description progresses. A transistor 74 with its collector connected to the base terminal of the trigger transistor 64 and its emitter grounded functions to disable the trigger transistor 64 when the second switch 52 is open.

Assuming that the door 24 is closed with the seat 22 unoccupied then the door switch 50 will be rendered open position whereas the seat switch 52 will remain in normally open position and thus current from a DC battery 76 will flow through a resistor 78 to charge condensors 80 and 82, and the transistor 74 will remain in "ON" condition thereby to ground the base terminal of the trigger transistor 64. Under this condition a voltage on the terminal 66 is lower than the breakdown voltage of the trigger transistor 64 and a voltage on a terminal 84 is higher than that on the terminal 66. It will be noted that when the trigger transistor 64 is disabled by its base terminal being grounded through the collector-emitter circuit of the transistor 74, the transistor 64 will remain in "OFF" condition, even if the voltage on the terminal 66 rise above the breakdown voltage of the transistor 64.

As the discussion progresses it will be understood that the voltage on the terminal 66 will temporarily rise above the breakdown voltage of the trigger transistor 64 upon opening of the door switch 50 with the seat switch 52 closed and the motor unit 44 will thus move the hook 42' temporarily to the inoperative position upon closing of the door 24 with the seat 24 occupied.

Assuming the door 24 is opened from the door closed position with the seat 22 unoccupied thus closing the switch 50, this will cause the charged electrons to flow through a resistor 86 and a diode 88. The condensors 80 and 82 will then be discharged thus causing the voltage on the terminal 84 to drop keeping the voltage on the terminal 66 low or below the breakdown voltage. Assuming the seat 22 is now occupied thus closing the switch 52, this will render the transistor 74 in OFF condition thus permitting the application of the voltage on the terminal 66 on the base terminal of the trigger transistor 64. Assuming the door 24 is subsequently closed with the seat 22 occupied, this will cause the condensors 80 and 82 to be charged. Then the voltage on the terminal 66 will rise above the breakdown voltage of the trigger transistor 64. The voltage on the terminal 66 will remain higher than the breakdown voltage when the condensors 80 and 82 are charged. In other words the breakdown voltage appears or is provided on the terminal 66 for a predetermined time upon opening of the door switch 50. The application of the breakdown voltage on the base of the trigger transistor 64 will render the power transistor 62 in ON condition to cause electric current to flow through the relay coil 58. The energization of the relay coil 58 causes the pair of relay contacts 60 to be closed with the result the motor unit 44 is energized for the predetermined time to move the hook 42' (see FIG. 1) to the inoperative position, thus releasing the shoulder belt 36 to allow the inertia retractors 34 and 40 to retract the lap belt 28 and the shoulder belt to their occupant restraining positions (not illustrated). The hook 42' will return to its operative position upon de-energization of the motor unit 44 by the force of the spring. A zenor diode 89 is provided with which the predetermined time is determined.

It will now be understood that with the control system of FIG. 3 the hook 42' will be moved temporarily to the inoperative position upon closing of the door 24 with the seat 22 occupied and will not be moved to the inoperative position when the seat 22 is unoccupied. This is accomplished by means (70, 86, 88, 89) for providing a breakdown voltage on the terminal 66 upon opening of the switch 50; means (58, 60, 62, 64) for energizing the motor unit 44 in response to the breakdown voltage; and means (74, 90, 92) for disabling the trigger transistor 64 when the switch 52 is open.

Reference is again made to FIG. 1 in connection with FIG. 3. When the door 24 is closed with the seat 22 occupied the inertia retractor 34 and 40 will maintain the lap belt 28 and the shoulder belt 36 in their occupant restraining positions. Upon getting out of the vehicle body 10, the seated occupant of the seat 22 will manually move and hang the shoulder belt 36 on the hook 42' that is in the operative position. During this manipulation the inertia retractor 40 is free to protract the shoulder belt 36. When, subsequently, the door 24 is moved to the FIG. 1 open position with the shoulder belt 36 received by the hook 42', the lap belt 28 and the shoulder belt 36 are positioned in easy-enter positions allowing convenient occupant egression or getting out from the vehicle body 10. When the door 24 is closed again, after getting out from the vehicle body 10 thus opening the seat switch 52, the shoulder belt 36 will be kept received by the hook 42' and the retractors 34 and 40 will retract the lap belt 28 and the shoulder belt 36, respectively.

During opening movement of the door 24, the inertia retractors 34 and 40 are free to protract the lap belt 28 and the shoulder belt 36. The door opening movement, of course, must be at a rate below that which will cause the protracting movement of the lap belt 28 and the shoulder belt 36 to lock the inertia retractors 34 and 40.

The use of the conventional inertia retractors has a drawback that the door opening movement must be at a rate below that which will cause the protruding movement of the lap belt 28 and the shoulder belt 36 to lock the inertia retractors 34 and 40. To overcome this drawback the inertia retractors should be replaced with releasable automatic locking inertia retractors 34 and 40. The first releasable automatic locking inertia retractor 34 mounted adjacent a lower inboard portion of a seat 22 receives a lap belt 28, whereas the second releasable automatic locking inertia retractor 40 receives a shoulder belt 36 (see FIG. 1). Each of the locking inertia retractors 34 and 40 includes a solenoid (not shown) having an armature (not shown) connected to locking inertia retractor to release the locking inertia retractor upon energization of the solenoid. A relay coil 94 connected in series with the door switch 50 has two pairs of relay contacts (not shown) which are normally open and are circuited with the releasing solenoids, respectively, so that the locking inertia retractors 34 and 40 are released upon energization of the relay 94. The locking inertia retractors 34 and 40 will be released when the door switch 50 is closed they will work as free retractors. Thus the door opening movement would not be resisted or locked even if the door 24 is opened rapidly.

As described in the preceding, in the vehicle semi-passive occupant restraining belt arrangement according to the present invention the hook 42' of the belt hanger 42 moves to its inoperative position upon closing of the door 24 with the seat 22 occupied and will not move to its inoperative position and will remain in its operative position in the other modes, thus the unnecessary movement of the hook 42' is prevented. Moreover the use of releasable automatic locking retractors 34 and 40 which are released upon energization of the relay coil 94 in series with the door switch 50 will allow smooth extension of the lap belt 28 and the shoulder belt 36 upon rapid opening of the door 24.

What is claimed is:

1. In combination with a vehicle body including a floor and a roof defining an occupant compartment having a vehicle seat accessible through a vehicle door opening selectively opened and closed, a vehicle body door having a front edge pivotally secured to the vehicle body for selectively opening and closing said vehicle door opening, a semi-passive occupant restraining belt arrangement comprising:
a first belt having one end fixed to an inboard lower rear portion of the door;
a first releasable automatic locking inertia retractor mounted adjacent a lower inboard portion of the seat, the releasable locking retractor receiving the other end of the first belt;
a second belt having one end secured to an intermediate portion of the first belt;
a second releasable automatic locking inertia retractor mounted adjacent an upper outboard portion of the seat, the second releasable locking retractor receiving the other end of the second belt;
releasable means for releasing the first and second locking inertia retractors;
a belt hanger fixedly mounted on the vehicle body within the occupant compartment forward and above the seat and having a hook,
the hook having an operative position in which if the second belt is manually hung on the hook, the hook will receive the second belt;
motor means for moving the hook from the operative position to an inoperative position in which the hook will release the second belt therefrom; and
control means for actuating the motor means to move the hook from the operative position to the inoperative position upon closure of the door with the seat occupied, the control means actuating the release means to release the first and second locking retractors during door opening and closing movements.

2. A semi-passive occupant restraining belt arrangement as claimed in claim 1, in which the control means comprises:
a first switch associated with the vehicle door, the first switch being closed when the door is open and being open when the door is closed;
a second switch associated with the seat, the second switch being open when the seat is unoccupied;
means responsive to the first switch for providing an electric signal at its output terminal for a predetermined time upon opening of the first switch;
means, having its input terminal connected with the output terminal, for energizing the motor means in response to the electric signal; and
means responsive to the second switch for disabling the energizing means when the second switch is open.

3. A semi-passive occupant restraining belt arrangement as claimed in claim 2, in which the control means further comprises means responsive to the first switch for energizing the releasable means when the first switch is closed.

* * * * *